United States Patent
Kamagata et al.

(10) Patent No.: US 11,619,287 B2
(45) Date of Patent: Apr. 4, 2023

(54) SPEED REDUCER

(71) Applicant: Nabtesco Corporation, Tokyo (JP)

(72) Inventors: Shuichi Kamagata, Tokyo (JP);
Takashi Naruse, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 17/827,343

(22) Filed: May 27, 2022

(65) Prior Publication Data

US 2022/0389994 A1 Dec. 8, 2022

(30) Foreign Application Priority Data

Jun. 4, 2021 (JP) .............................. JP2021-094389

(51) Int. Cl.
*F16H 1/32* (2006.01)
*F16H 37/02* (2006.01)

(52) U.S. Cl.
CPC .............. *F16H 37/02* (2013.01); *F16H 1/32* (2013.01); *F16H 2001/325* (2013.01)

(58) Field of Classification Search
CPC ....... F16H 37/02; F16H 1/32; F16H 2001/325
See application file for complete search history.

(56) References Cited

U.S. PATENT DOCUMENTS

| | | | | |
|---|---|---|---|---|
| 7,604,559 | B2 * | 10/2009 | Fujimoto | F16H 1/32 475/170 |
| 8,022,564 | B2 * | 9/2011 | Nohara | F03D 7/0204 290/55 |
| 9,752,653 | B1 * | 9/2017 | Yao | F16H 1/32 |
| 10,619,706 | B2 * | 4/2020 | Uehara | F16H 1/32 |

FOREIGN PATENT DOCUMENTS

| | | |
|---|---|---|
| EP | 0551918 A2 | 7/1993 |
| EP | 1707845 A1 | 10/2006 |
| JP | 05-44790 A | 2/1993 |
| JP | 11-210843 A | 8/1999 |
| JP | 6376964 B2 | 8/2018 |
| JP | 2019-019839 A | 2/2019 |

OTHER PUBLICATIONS

Extended European Search Report dated Oct. 24, 2022, issued in corresponding European Patent Application No. 22176416.0 (12 pgs.).

* cited by examiner

*Primary Examiner* — Tinh Dang
(74) *Attorney, Agent, or Firm* — Pillsbury Winthrop Shaw Pittman, LLP (57) ABSTRACT

A speed reducer includes an outer tubular member, internal tooth pins, oscillating gears and a carrier block. The outer tubular member has pin grooves on an inner circumferential surface thereof. The internal tooth pins are rotatably placed in the pin grooves. The oscillating gears have external teeth smaller in number than the pin grooves, and the oscillating gears are oscillatorily rotatable with the external teeth engaging with the internal tooth pins. The carrier block is cooperatively connected to the oscillating gears such that the oscillating gears are allowed to oscillatorily rotate relative to the carrier block and restricted from rotating on own axis relative to the carrier block. A displacement restricting member configured to restrict the internal tooth pins from being displaced inwardly in a radial direction of the outer tubular member is disposed between the outer peripheries of the oscillating gears adjacent to each other.

5 Claims, 7 Drawing Sheets

SPEED REDUCER

CROSS-REFERENCE TO RELATED APPLICATIONS

The present application is based on and claims the benefit of priority from Japanese Patent Application Serial No. 2021-094389 (filed on Jun. 4, 2021), the contents of which are hereby incorporated by reference in their entirety.

TECHNICAL FIELD

The present disclosure relates to a speed reducer for reducing a speed of rotation of a rotational drive source.

BACKGROUND

Rotary devices including industrial robots and machine tools utilize speed reducers to reduce the speed of the rotation of rotational drive sources. See, for example, Japanese Patent Application Publication No. H 11-210843 ("the '843 Publication").

The speed reducer described in the '843 Publication includes an outer tubular member serving also as a casing, a carrier block, a plurality of crankshafts, two oscillating gears, a plurality of internal tooth pins, and an input rotating body. The carrier block is rotatably supported within the outer tubular member. The crankshafts are rotatably supported by the outer peripheral edge of the carrier block. The two oscillating gears are oscillatorily rotatable (turnable) when acted upon by the rotation of the eccentric portions of the crankshafts. The internal tooth pins are provided within the outer tubular member in a region facing the outer circumferential surface of the two oscillating gears. The input rotating body is configured to input rotational power to the crankshafts. In this speed reducer, the input rotating body is connected to a rotational driving source such as a motor. The carrier block is coupled to a to-be-rotated member. The crankshafts are each provided with two eccentric portions for oscillating (turning) the two oscillating gears with different phases (for example, 180 degrees out of phase).

A plurality of pin grooves, which are longitudinal in the axial direction, are formed in the inner circumferential surface of the outer tubular member in the region facing the outer circumferential surfaces of the two oscillating gears. The pin grooves are arranged at predetermined intervals in the circumferential direction. The internal tooth pins are rotatably placed in the respective pin grooves. The outer circumferential surface of each oscillating gear is externally toothed. The external teeth are smaller in number than the internal tooth pins. While the two oscillating gears oscillatorily rotate (turn) once together with the eccentric portions of the crankshafts, the external teeth are subject to a reaction force from the internal tooth pins with the external teeth meshing with the internal tooth pins. Accordingly, the two oscillating gears rotate (on their own axis) a predetermined pitch in the opposite direction to the oscillatory rotating direction. Here, the rotation (on their own axis) of the two oscillating gears is transmitted to the carrier block via the crankshafts. As a result, the rotation transmitted from the input rotating body to the crankshafts and oscillating gears is reduced in speed by a predetermined reduction ratio, and the reduced rotation is output to the carrier block.

In the speed reducer disclosed in the '843 Publication, the depth of the engagement between the external teeth and the internal tooth pins may depend on the position of the oscillating gears while they oscillatorily rotate. Some of the internal tooth pins may not be subject to the pressing force from the external teeth depending on where the oscillating gears are positioned while oscillatorily rotating. This phenomenon is particularly likely to occur if the number of external teeth of the oscillating gears is less than the number of internal tooth pins by two or more in order to increase the number of rotations to be output from the speed reducer. If this phenomenon occurs, the internal tooth pins move out of the pin grooves. This may result in the speed reducer operating less reliably.

SUMMARY

The present disclosure is designed to provide a speed reducer that is capable of preventing the internal tooth pins from behaving in an unstable manner while the speed reducer is operating.

(1) One aspect of the present disclosure provides a speed reducer including an outer tubular member having a plurality of pin grooves on an inner circumferential surface thereof, a plurality of internal tooth pins rotatably disposed in the pin grooves of the outer tubular member, a plurality of oscillating gears having external teeth smaller in number than the internal tooth pins, where the oscillating gears are oscillatorily rotatable with the external teeth engaging with the internal tooth pins, and a carrier block rotatably supported by the outer tubular member. The carrier block is cooperatively connected to the oscillating gears such that the oscillating gears are allowed to oscillatorily rotate relative to the carrier block and the oscillating gears are restricted from rotating on own axis relative to the carrier block. An annular displacement restricting member is disposed between outer peripheries of the oscillating gears adjacent to each other. The displacement restricting member restricts the internal tooth pins from being displaced inwardly in a radial direction of the outer tubular member.

(2) A width of the displacement restricting member in an axial direction of the outer tubular member may be less than an interval between the outer peripheries of the oscillating gears adjacent to each other.

(3) On inner peripheries of the oscillating gears adjacent to each other, bosses may be provided that abut each other in the axial direction of the outer tubular member.

(4) Another aspect of the present disclosure provides a speed reducer including an outer tubular member having a plurality of pin grooves on an inner circumferential surface thereof, a plurality of internal tooth pins rotatably disposed in the pin grooves of the outer tubular member, an oscillating gear having external teeth smaller in number than the internal tooth pins, where the oscillating gear is oscillatorily rotatable with the external teeth engaging with the internal tooth pins, and a carrier block rotatably supported by the outer tubular member. The carrier block is cooperatively connected to the oscillating gear such that the oscillating gear is allowed to oscillatorily rotate relative to the carrier block and the oscillating gear is restricted from rotating on own axis relative to the carrier block. The carrier block further includes an adjacently arranged portion that is adjacent to and axially outside the oscillating gear. The internal tooth pins are axially long such that the internal tooth pins protrude axially outwardly beyond the oscillating gear. The adjacently arranged portion is provided with an annular displacement restricting portion, and the displacement restricting portion is positioned inside the internal tooth pins in a radial direction of the outer tubular member and axially overlaps ends of the internal tooth pins.

(5) Another aspect of the present disclosure provides a speed reducer including an outer tubular member having a plurality of pin grooves on an inner circumferential surface thereof, a plurality of internal tooth pins rotatably disposed in the pin grooves of the outer tubular member, an oscillating gear having external teeth smaller in number than the internal tooth pins, where the oscillating gear is oscillatorily rotatable with the external teeth engaging with the internal tooth pins, a carrier block rotatably supported by the outer tubular member, and a bearing disposed between the outer tubular member and the carrier block. The carrier block is cooperatively connected to the oscillating gear such that the oscillating gear is allowed to oscillatorily rotate relative to the carrier block and the oscillating gear is restricted from rotating on own axis relative to the carrier block. The internal tooth pins are axially long such that the internal tooth pins protrude axially outwardly beyond the oscillating gear. An inner race of the bearing is provided with an annular displacement restricting portion, and the displacement restricting portion is positioned inside the internal tooth pins in a radial direction of the outer tubular member and axially overlaps ends of the internal tooth pins.

The above-described speed reducers can restrict the internal tooth pins from being displaced inwardly in the radial direction of the outer tubular member. The internal tooth pins can be prevented from behaving unreliably during the operation of the speed reducers.

DESCRIPTION OF THE PREFERRED EMBODIMENTS

The following describes embodiments of the present disclosure with reference to the drawings. In the following embodiments, like elements will be denoted by the same reference signs and redundant descriptions will be partly omitted.

First Embodiment

Figure 1:
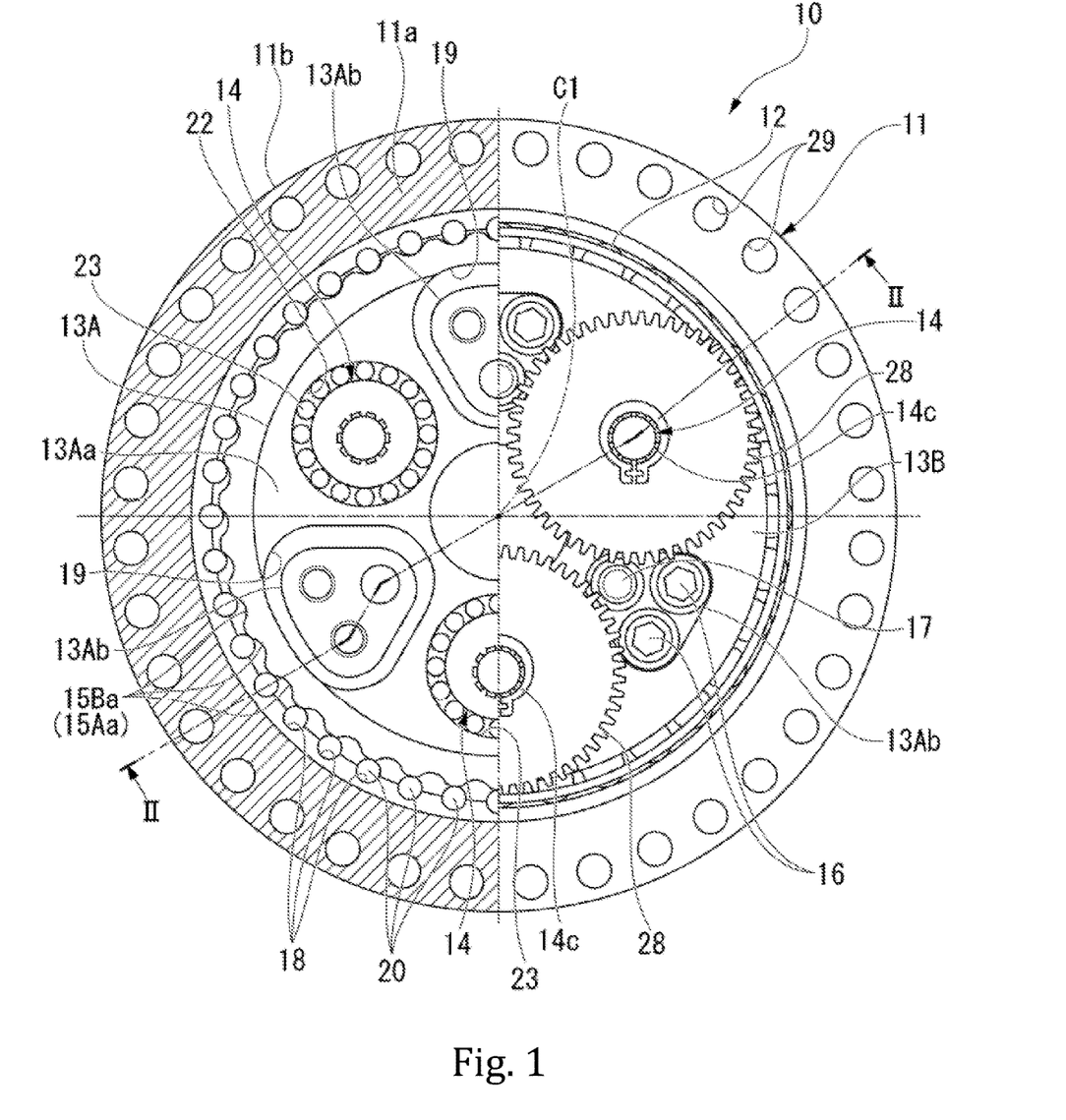
FIG. 1 is a partial sectional front view of a speed reducer according to a first embodiment.
Figure 2:
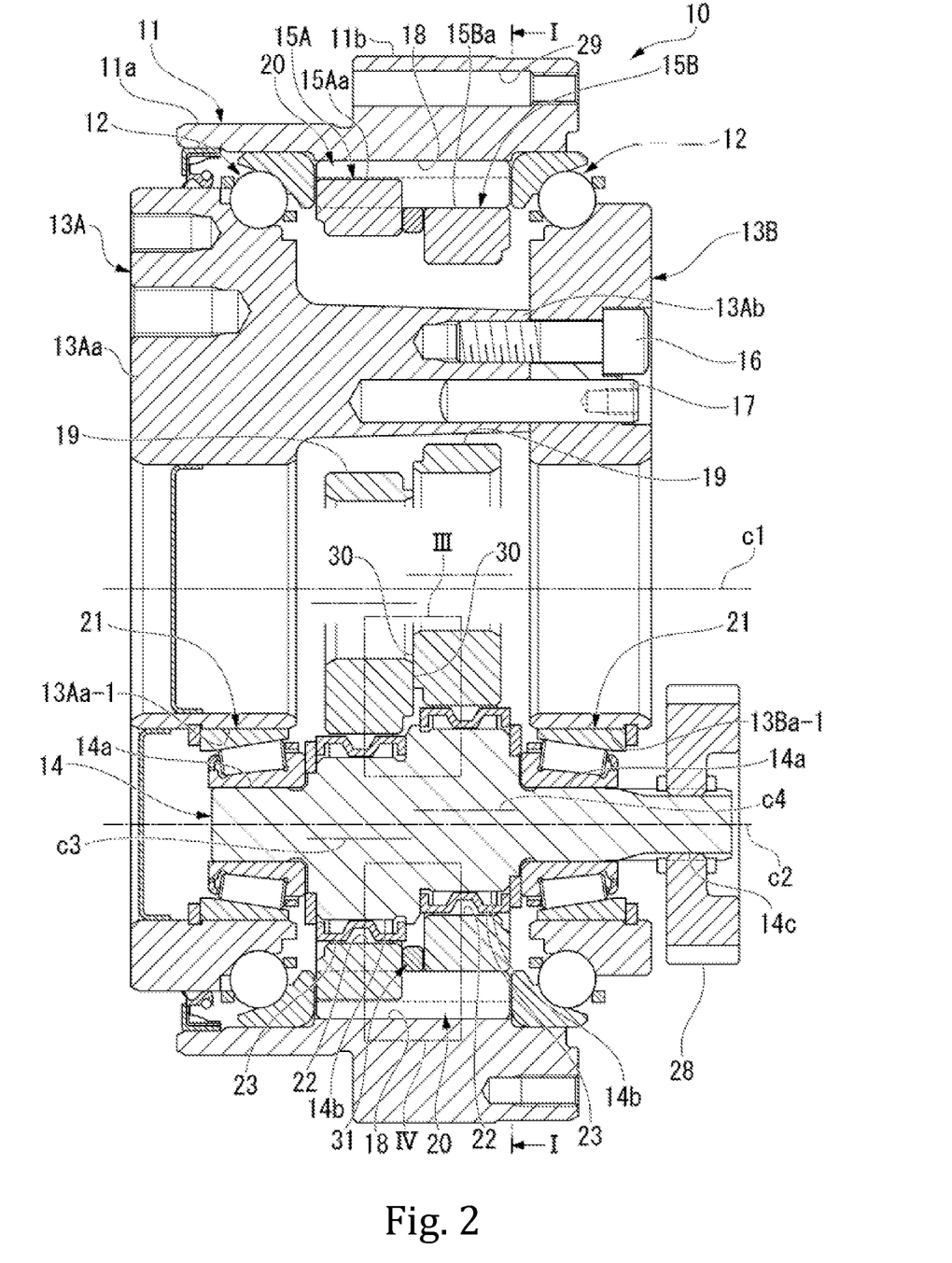
FIG. 2 is a sectional view of the speed reducer along the line II-II in FIG. 1.

FIG. 1 is a partial sectional front view showing a speed reducer 10 relating to a first embodiment from the input side. FIG. 2 is a sectional view along a line II-II in FIG. 1. The sectional view shown in FIG. 1 is cut along the line I-I in FIG. 2. The speed reducer 10 includes a substantially cylindrical casing 11, which serves as an outer tubular member, and first and second carrier block 13A and 13B rotatably held on the inner circumferential surface of the casing 11. The speed reducer 10 further includes a plurality of (e.g., three) crankshafts 14 rotatably supported on the first and second carrier blocks 13A and 13B, a first oscillating gear 15A, and a second oscillating gear 15B. The first and second oscillating gears 15A and 15B are oscillatorily rotatable (turnable) together with two eccentric regions 14b of each crankshaft 14. In the present embodiment, the first and second carrier blocks 13A and 13B form a carrier block, which serves as an output rotating body. The casing 11 is fixedly attached to a desired portion such as knuckles of industrial robots. The first and second carrier blocks 13A and 13B output the reduced rotation produced by the speed reducer 10 to an external to-be-rotated member.

The first carrier block 13A includes a substrate portion 13Aa and a plurality of support columns 13Ab. The substrate portion 13Aa has a disk-like shape with a hole formed therein, and the support columns 13Ab extend from the end surface of the substrate portion 13Aa toward the second carrier block 13B. The second carrier block 13B has a disc-like shape with a hole formed therein. The first carrier block 13A is assembled with the second carrier block 13B, such that the end surfaces of the support columns 13Ab abut the end surface of the second carrier block 13B. The support columns 13Ab are fixedly fastened to the second carrier block 13B with bolts 16. The reference number 17 in the drawings indicates an alignment pin for aligning the second carrier block 13B with the support columns 13Ab before the support columns 13Ab are fastened with the second carrier block 13B with the bolts 16.

A gap is left between the substrate portion 13Aa of the first carrier block 13A and the second carrier block 13B in the axial direction. In this gap, the first and second oscillating gears 15A and 15B are arranged. The first and second oscillating gears 15A and 15B each have relief holes 19 formed therein, which are penetrated by the support columns 13Ab of the first carrier block 13A. The relief holes 19 have a sufficiently larger size than the outer diameter of the support columns 13Ab, so that the support columns 13Ab do not prevent the oscillatory rotation of the first and second oscillating gears 15A and 15B.

The casing 11 includes a casing body 11a having a hollow cylindrical shape and a flange 11b extending radially outwardly from the outer circumferential surface of the casing body 11a. The flange 11b has a plurality of bolt insertion holes 29 penetrating therethrough in the axial direction. The bolt insertion holes 29 receive bolts (not shown) to fixedly fasten the casing 11 onto the desired portion.

The casing body 11a extends in the axial direction over the outer circumferential surface of the substrate portion 13Aa of the first carrier block 13A and the outer circumferential surface of the second carrier block 13B. The substrate portion 13Aa of the first carrier block 13A and the second carrier block 13B are respectively rotatably supported via bearings 12 on the edges of the casing body 11a where the casing body 11a terminates in the axial direction. The middle region of the casing body 11a in the axial direction faces the outer circumferential surfaces of the first and second oscillating gears 15A and 15B. A plurality of pin grooves 18 are formed in the inner circumferential surface of the middle region of the casing body 11a and extend parallel to an axis c1 on which the first and second carrier blocks 13A and 13B are rotatable. The pin grooves 18 have a semicircular section. The pin grooves 18 are formed in the inner circumferential surface of the casing body 11a and arranged at equal pitches in the circumferential direction. Each pin groove 18 receives an internal tooth pin 20 therein. The internal tooth pins 20 have a substantially cylindrical shape and are received in a rotatable manner. The internal tooth pins 20 attached to the inner circumferential surface of the casing body 11a face the outer circumferential surfaces of the first and second oscillating gears 15A and 15B.

The first and second oscillating gears 15A and 15B have an outer diameter slightly smaller than the inner diameter of the casing body 11a. The outer circumferential surfaces of the first and second oscillating gears 15A and 15B are externally toothed. The external teeth 15Aa and 15Ba are formed such that the external teeth 15Aa and 15Ba touch and mesh with the internal tooth pins 20 on the inner circumferential surface of the case body 11a. The number of external teeth 15Aa and 15Ba formed on the outer circumferential surfaces of the first and second oscillating gears 15A and 15B is slightly less than (for example, by two) the number of internal tooth pins 20 (pin grooves 18).

The crankshafts 14 are arranged on a circle centered at the rotational center axis c1 of the first and second carrier blocks 13A and 13B. Each crankshaft 14 is rotatably supported by the first and second carrier blocks 13A and 13B via bearings 21. Each crankshaft 14 includes a pair of shaft support regions 14a. The shaft support regions 14a are separated from each other in the axial direction. In addition, each crankshaft 14 has two eccentric regions 14b located between the shaft support regions 14a. On one of the ends of the crankshaft 14 in the axial direction, a gear attachment portion 14c is formed adjacently to the corresponding one of the shaft support regions 14a. The shaft support regions 14a are rotatably supported via the bearings 21 while being inserted through a shaft support hole 13Aa-1 formed in the first carrier block 13A (substrate portion 13Aa) and a shaft support hole 13Ba-1 formed in the second carrier block 13B.

Central axes c3 and c4 of the two eccentric regions 14b of each crankshaft 14 are offset from the central axis c2 of the shaft support regions 14a. The two eccentric regions 14b are 180 degrees out of phase in the circumferential direction around the central axis c2 of the shaft support regions 14a (the central axis of the crankshaft 14).

The eccentric regions 14b of each crankshaft 14 penetrate the first and second oscillating gears 15A and 15B. The eccentric regions 14b are rotatably held, via eccentric portion bearings 23, in support holes 22 formed in the first and second oscillating gears 15A and 15B.

In the speed reducer 10 relating to the first embodiment, as the crankshafts 14 rotate in one direction when acted upon by an external force, the eccentric regions 14b of the crankshafts 14 oscillatorily rotate in the same direction with a predetermined radius. As the eccentric regions 14b oscillatorily rotate, the first and second accordingly oscillating gears 15A and 15B oscillatorily rotate in the same direction with the same radius. Simultaneously, the external teeth 15Aa and 15Ba of the first and second oscillating gears 15A and 15B touch and mesh with the internal tooth pins 20 retained on the inner circumferential surface of the casing body 11a. The gear attachment portion 14c of each crankshaft 14 extends through the shaft support hole 13Ba-1 of the second carrier block 13B and protrudes axially outwardly beyond the second carrier block 13B. The gear attachment portion 14c protruding beyond the second carrier block 13B has a crankshaft gear 28 attached thereto. The crankshaft gears 28 mesh with an input gear (not shown). The input gear is rotatable when acted upon by a driving force from a driving motor (not shown).

In the speed reducer 10 of the present embodiment, the number of external teeth 15Aa and 15Ba of the first and second oscillating gears 15A and 15B is slightly smaller than the number of internal tooth pins 20 (pin grooves 18) on the casing body 11a. Accordingly, while the first and second oscillating gears 15A and 15B oscillatorily rotate once, the first and second oscillating gears 15A and 15B are subject to a reaction force acting in the rotating direction from the internal tooth pins 20 on the casing body 11a, so that the first and second oscillating gears 15A and 15B rotate on their own axes by a predetermined pitch in the opposite direction to the oscillatory rotating direction. As a result, the first and second carrier blocks 13A and 13B, which are cooperatively connected with the first and second oscillating gears 15A and 15B via the crankshafts 14, rotate in the same direction and by the same pitch together with the first and second oscillating gears 15A and 15B. As a result, the rotation of the crankshafts 14 is reduced in speed, and the reduced rotation is output in the form of the rotation of the first and second carrier blocks 13A and 13B. In the present embodiment, since the two eccentric regions 14b of the crankshafts 14 are 180 degrees out of phase in the circumferential direction around the axis, the first and second oscillating gears 15A and 15B oscillatorily rotate 180 degrees out of phase.

In the foregoing description, the outer tubular member (casing 11) is fixedly attached to a desired portion, and the carrier block (first and second carrier blocks 13A and 13B) are coupled to a to-be-rotated member. The present embodiment, however, is not limited to such. For example, the outer tubular member can be coupled to the to-be-rotated member, and the carrier block can be fixedly attached to the desired portion. In this case, while the first and second oscillating gears 15A and 15B turn once, their rotation on their own axes is restricted by the carrier block (first and second carrier blocks 13A and 13B). This causes the outer tubular member (casing 11) to be pushed by a predetermined pitch in the same direction as the oscillatory rotating direction of the first and second oscillating gears 15A and 15B. As a result, with this alternative arrangement, the rotation reduced by the speed reducer 10 can be output to an external unit (to-be-rotated member) via the outer tubular member.

Figure 3:
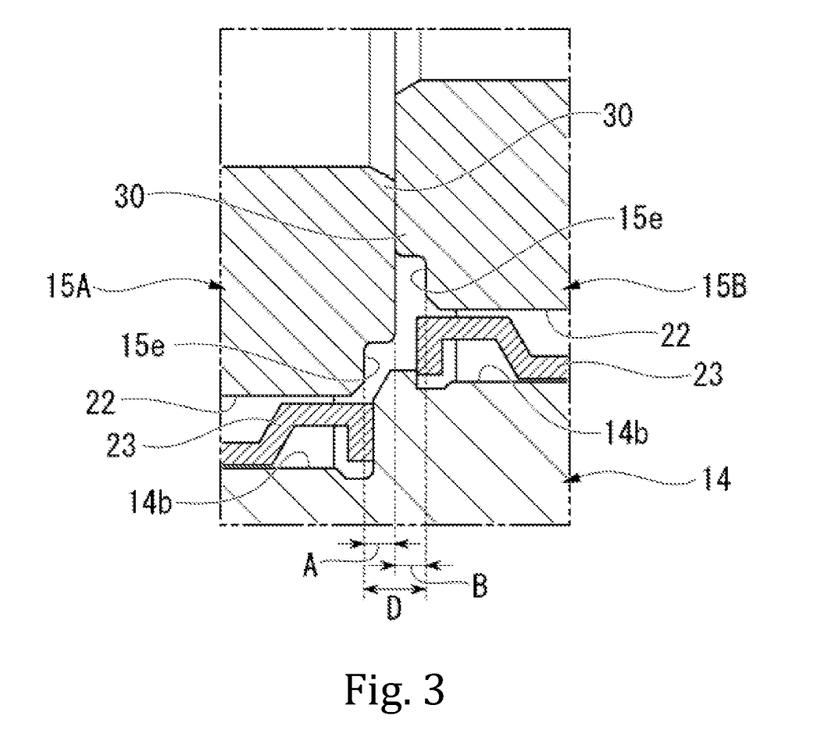
FIG. 3 is an enlarged view of a portion III shown in FIG. 2.
Figure 4:
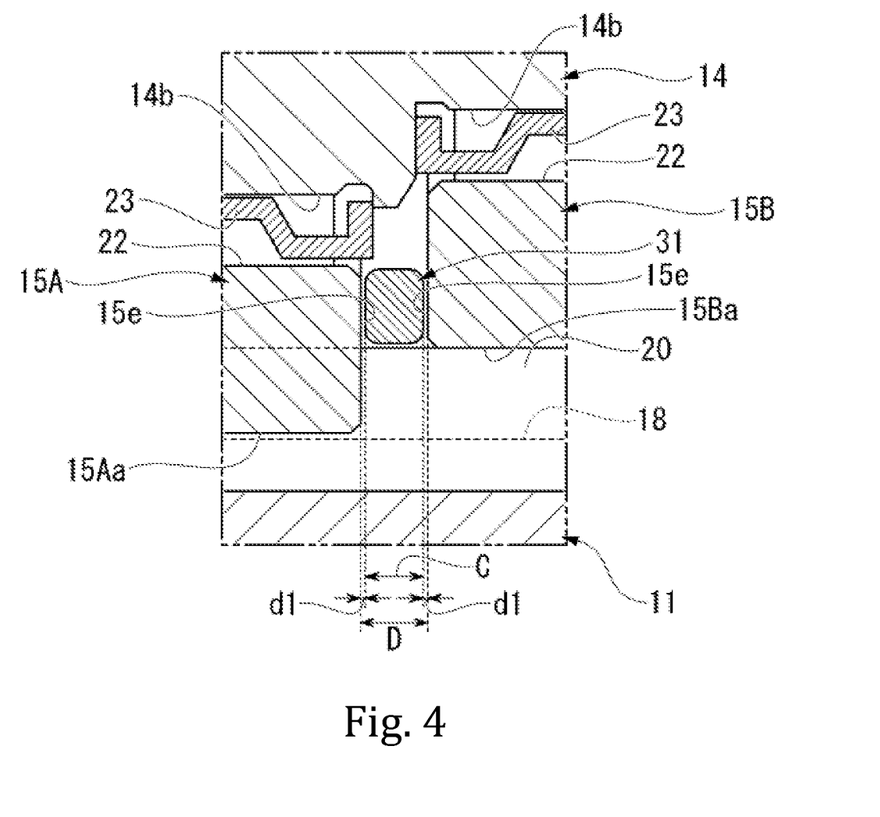
FIG. 4 is an enlarged view of a portion IV shown in FIG. 2.

FIG. 3 is an enlarged view of a portion III of FIG. 2. FIG. 4 is an enlarged view of a portion IV of FIG. 2. The first and second oscillating gears 15A and 15B are shaped like a circular plate with holes being formed therein. The first and second oscillating gears 15A and 15B are arranged such that their side surfaces face each other, and these side surfaces have bosses 30 formed thereon. The bosses 30 are formed on the side surfaces of the first and second oscillating gears 15A and 15B facing each other in a region radially inside the support holes 22 (through which the crankshafts 14 are inserted). The bosses 30 are shaped like a circle centered on the same axis as the outer periphery of the first and second oscillating gears 15A and 15B. The first and second oscillating gears 15A and 15B abut each other at their respective bosses 30. This leaves a gap, as shown in FIG. 3, between an outer periphery 15e of the first oscillating gear 15A and an outer periphery 15e of the second oscillating gear 15B. In other words, a separation width D corresponding to the sum of protruding dimensions A and B of the bosses 30 is left between the outer periphery 15e of the first oscillating gear 15A and the outer periphery 15e of the second oscillating gear 15B. The entire surface of the first and second oscillating gears 15A and 15B, including the bosses 30, has been hardened by, for example, carburizing and quenching. Accordingly, even if the first and second oscillating gears 15A and 15B rotate and accordingly move relative to each other, the bosses 30 hardly wear out each other.

As shown in FIGS. 2 and 4, an annular displacement restricting member 31 is arranged in the gap between the outer periphery 15e of the first oscillating gear 15A and the outer periphery 15e of the second oscillating gear 15B. The displacement restricting member 31 is, for example, made of a metal material and shaped like a short cylinder. The inner diameter of the displacement restricting member 31 is determined such that the displacement restricting member 31 is positioned on the outer peripheries 15e of the first and second oscillating gears 15A and 15B and radially outside the support holes 22. Furthermore, the width C of the displacement restricting member 31 in the axial direction (the width in the axial direction of the casing 11 serving as the outer tubular member) is less than the separation width between the outer peripheries 15e of the adjacent first and second oscillating gears 15A and 15B (D=A+B). With such configurations, the displacement restricting member 31 arranged between the outer peripheries 15e of the first and second oscillating gears 15A and 15B can provide a minute gap d1 (for example, 0.1 to 0.2 mm) in the axial direction between the outer peripheries 15e of the first and second oscillating gears 15A and 15B.

The displacement restricting member 31, which is arranged between the outer peripheries 15e of the first and second oscillating gears 15A and 15B, is positioned within the casing 11 radially inside the internal tooth pins 20, which are housed within the pin grooves 18 of the casing 11. The outer circumferential surface of the displacement restricting member 31 faces, in the radial direction, the axially middle regions of the internal tooth pins 20. In this way, the displacement restricting member 31 restricts the internal tooth pins 20 from being displaced excessively radially inwardly within the casing 11.

As described above, the speed reducer 10 relating to the present embodiment has the annular displacement restricting member 31, which is configured to restrict the internal tooth pins 20 from being displaced radially inwardly within the casing 11 (outer tubular member), between the outer peripheries 15e of the adjacent first and second oscillating gears 15A and 15B. Accordingly, if some of the external teeth 15Aa and 15Ba of the first and second oscillating gears 15A and 15B engage with the internal tooth pins 20 less deeply during the operation of the speed reducer 10, the internal tooth pins 20 come into contact with the outer circumferential surface of the displacement restricting member 31. This can prevent the internal tooth pins 20 from moving away from the pin grooves 18. If the speed reducer 10 relating to the present embodiment is employed, the internal tooth pins 20 can be saved from behaving unreliably during the operation of the speed reducer 10. The speed reducer 10 can thus operate more stably.

In the speed reducer 10 relating to the present embodiment, the width C of the displacement restricting member 31 in the axial direction of the casing 11 (the outer tubular member) is less than the width (the separation width D) between the outer peripheries 15e of the first and second oscillating gears 15A and 15B. With such configuration, while the first and second oscillating gears 15A and 15B oscillatorily rotate, the outer peripheries 15e of the first and second oscillating gears 15A and 15B can avoid tightly touching the side surfaces of the displacement restricting member 31. As a result, the speed reducer 10 relating to the present embodiment can successfully reduce wear and breakage of the displacement restricting member 31, so that the displacement restricting member 31 can remain operative for a long period of time.

In the speed reducer 10 relating to the present embodiment, the gap d1 can be left between the annular displacement restricting member 31 and the outer peripheries 15e of the first and second oscillating gears 15A and 15B. This enables a lubricating fluid, which fills the casing 11, to efficiently flow through the gap d1 in the direction toward the internal tooth pins 20. Accordingly, the speed reducer 10 relating to the present embodiment can achieve improved lubrication for the internal tooth pins 20.

In addition, in the speed reducer 10 of the present embodiment, the bosses 30 are provided on the first and second oscillating gears 15A and 15B and abut each other in the axial direction of the casing 11 (outer tubular member). With such configuration, the width D between the outer peripheries 15e of the first and second oscillating gears 15A and 15B can be easily and accurately determined and adjusted by controlling the protruding height of the bosses 30.

Second Embodiment

Figure 5:
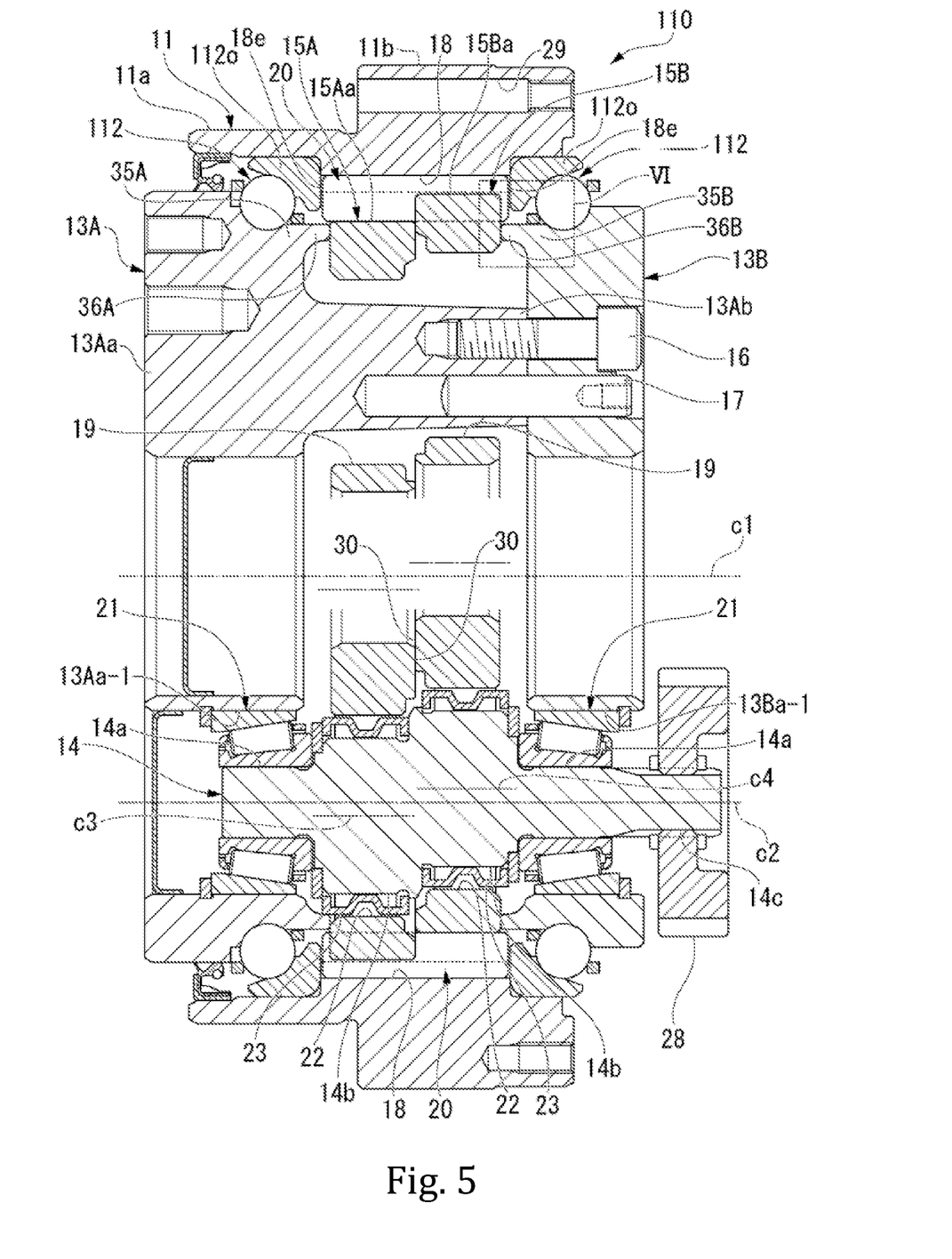
FIG. 5 is a sectional view of a speed reducer according to a second embodiment.
Figure 6:
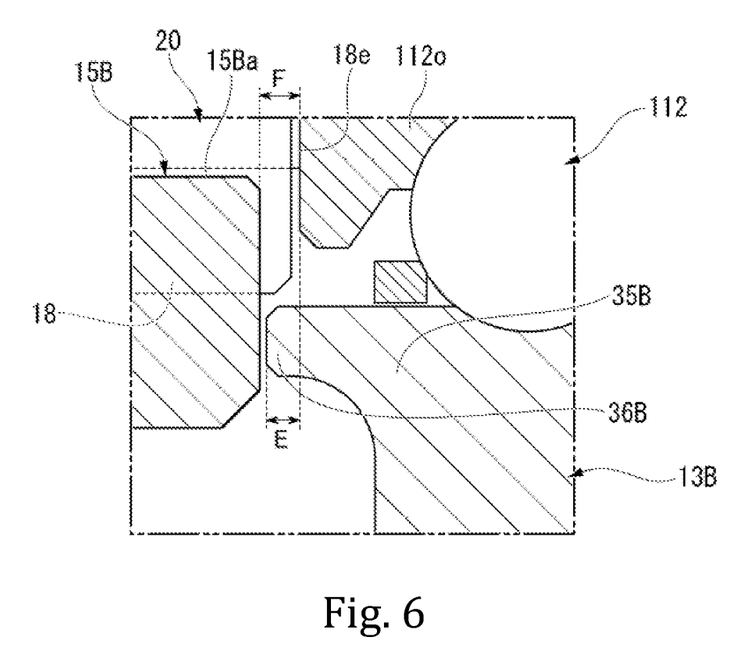
FIG. 6 is an enlarged view of a portion VI shown in FIG. 5.

FIG. 5 is a sectional view of a speed reducer 110 according to a second embodiment. FIG. 5 corresponds to the sectional view of FIG. 2 showing the first embodiment. FIG. 6 is an enlarged view of a portion VI of FIG. 5. The speed reducer 110 relating to the second embodiment includes a casing 11 serving as an outer tubular member, a first carrier block 13A, a second carrier block 13B, crankshafts 14, a first oscillating gear 15A, and a second oscillating gear 15B, like the speed reducer 10 relating to the first embodiment. These basic components of the second embodiment are the same as those of the first embodiment. The speed reducer 110 relating to the second embodiment, however, is practiced without a displacement restricting member between the outer peripheries of the first and second oscillating gears 15A and 15B.

In the speed reducer 110 of the second embodiment, a shoulder 35A (adjacently arranged portion) is provided on the outer periphery of the substrate portion 13Aa of the first carrier block 13A. The shoulder 35A is positioned adjacent to and axially outside the first oscillating gear 15A. The shoulder 35A has a cylindrical (annular) displacement restricting portion 36A integrated therewith. The displacement restricting portion 36A protrudes toward the first oscillating gear 15A. On the outer periphery of the second carrier block 13B, a shoulder 35B (adjacently arranged portion) is provided axially outside the second oscillating gear 15B. The shoulder 35B is positioned adjacent to and axially outside the second oscillating gear 15B. The shoulder 35B has a cylindrical (annular) displacement restricting portion 36B integrated therewith. The displacement restricting portion 36B protrudes toward the second oscillating gear 15B. The displacement restricting portions 36A and 36B overlap the ends of the internal tooth pins 20 in the axial direction while protruding inwardly beyond the internal tooth pins 20 in the radial direction of the casing 11.

In the present embodiment, the outer circumferential surface of the shoulder 35A of the first carrier block 13A forms the inner race of a first one of bearings 112. The outer circumferential surface of the shoulder 35B of the second carrier block 13B formed the inner race of a second one of the bearings 112. The first bearing 112 is arranged between the first carrier block 13A and a first one of the ends of the casing 11 in the axial direction. The second bearing 112 is arranged between the second carrier block 13B and a second one of the ends of the casing 11 in the axial direction. An outer race 112o of the first bearing 112 is in contact with first end surfaces 18e of the pin grooves 18 and with the inner circumferential surface of the first end of the casing 11. Similarly, an outer race 112o of the second bearing 112 is in contact with second end surfaces 18e of the pin grooves 18 and with the inner circumferential surface of the second end of the casing 11.

The cylindrical displacement restricting portions 36A and 36B of the first and second carrier blocks 13A and 13B are positioned inside, in the radial direction of the casing 111, the internal tooth pins 20 housed in the pin grooves 18 of the casing 11. As shown in FIG. 6, the displacement restricting portion 36B protrudes inwardly in the axial direction (toward the second oscillating gear 15B) beyond the second end surfaces 18e of the pin grooves 18 by a predetermined length E. Although not shown in the drawings, the other displacement restricting portion 36A protrudes inwardly in the axial direction (toward the first oscillating gear 15A) beyond the first end surfaces 18e of the pin grooves 18 by the predetermined length E.

The internal tooth pins 20, which are housed in the pin grooves 18 of the casing 11, are long in the axial direction such that they axially outwardly protrude beyond the first and second oscillating gears 15A and 15B. In other words, the axial length of the internal tooth pins 20 is greater than the sum of the width of the first oscillating gear 15A in the axial direction and the width of the second oscillating gear 15B in the axial direction. The axial length of the internal tooth pins 20 is, however, less than the axial width of the pin grooves 18 formed in the casing 11. With such configuration, the rotation of the internal tooth pins 20 housed in the pin grooves 18 is not restricted by interference between (i) the ends of the internal tooth pins 20 in the axial direction and (ii) the edges of the outer races 112c of the bearings 112.

As shown in FIG. 6, the annular displacement restricting portions 36A and 36B of the first and second carrier blocks 13A and 13B overlap, a predetermined amount in the axial direction, the axial ends of the internal tooth pins 20, which are housed in the pin grooves 18. While the first and second oscillating gears 15A and 15B oscillatorily rotate, the internal tooth pins 20 may tend to move out of the pin grooves 18. In this case, the axial ends of the internal tooth pins 20 come into contact with the outer circumferential surface of the annular displacement restricting portions 36A and 36B. This can result in restricting the internal tooth pins 20 from being displaced such that they move out of the pin grooves 18. The protruding length E of the displacement restricting portions 36A and 36B in the overlapping direction beyond the end surface 18e of the pin grooves 18 is less than the length F from the axially external end surfaces of the first and second oscillating gears 15A and 15B to the end surfaces of the outer races 112o of the bearings 112 (to the end surfaces 18e of the pin grooves 18) (E<F). With such configuration, the oscillatory rotation of the first and second oscillating gears 15A and 15B is not restricted by interference between (i) the displacement restricting portions 36A and 36B and (ii) the end surfaces of the first and second oscillating gears 15A and 15B in the axial direction.

As described above, in the speed reducer 110 relating to the second embodiment, the internal tooth pins 20 are long in the axial direction such that they axially outwardly protrude beyond the first and second oscillating gears 15A and 15B. On the shoulders 35A and 35B (adjacently arranged portions) of the first and second carrier blocks 13A and 13B, the cylindrical displacement restricting portions 36A and 36B are positioned inside the internal tooth pins 20 in the radial direction of the casing 11 and overlap the ends of the internal tooth pins 20 in the axial direction. Accordingly, if some of the external teeth 15Aa and 15Ba of the first and second oscillating gears 15A and 15B engage with the internal tooth pins 20 less deeply during the operation of the speed reducer 110, the internal tooth pins 20 come into contact with the outer circumferential surface of the displacement restricting portions 36A and 36B. In this manner, the internal tooth pins 20 can be prevented from moving out of the pin grooves 18. If the speed reducer 110 relating to the present embodiment is employed, the internal tooth pins 20 can be saved from behaving unreliably during the operation of the speed reducer 110. The speed reducer 110 can thus operate more stably.

In the speed reducer 110 relating to the second embodiment, the cylindrical displacement restricting portions 36A and 36B, which protrude axially inwardly, are integrally formed on the shoulders 35A and 35B (adjacently arranged portions) of the first and second carrier blocks 13A and 13B. The displacement restricting portions 36A and 36B are used to prevent the internal tooth pins 20 from moving out of the pin grooves 18. Unlike the case where dedicated components are additionally provided to prevent the internal tooth pins 20 from moving out of the pin grooves 18, the speed reducer 110 relating to the present embodiment can achieve a reduced number of components and a reduced axial length.

Third Embodiment

Figure 7:
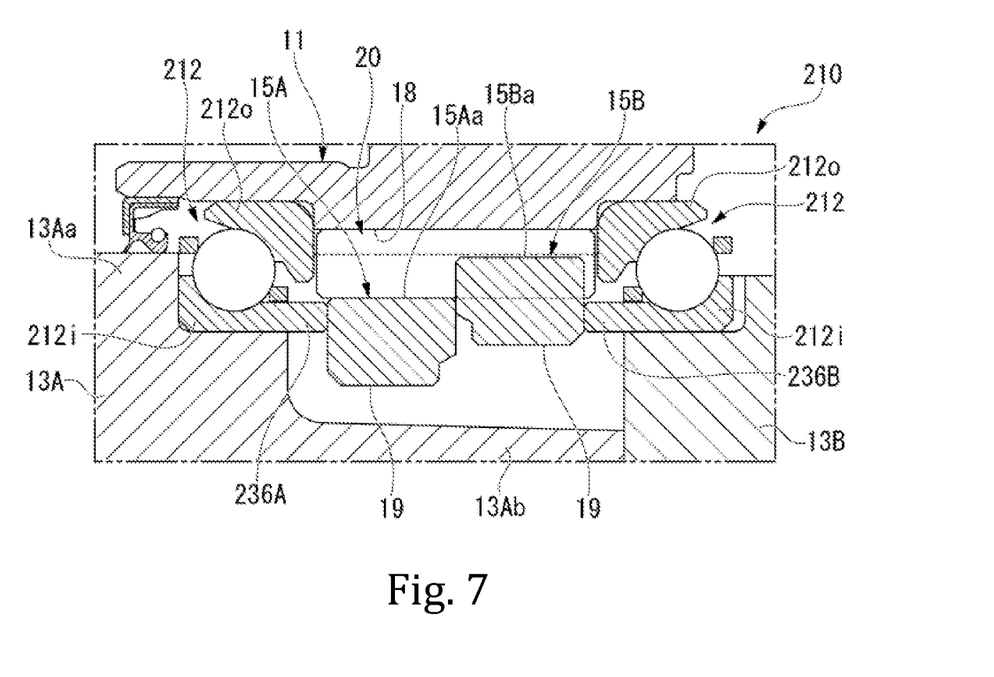
FIG. 7 is a sectional view of part of a speed reducer according to a third embodiment.

FIG. 7 is a sectional view showing part of a speed reducer 210 according to a third embodiment. FIG. 7 shows part of a sectional view corresponding to the sectional view of FIG. 2 showing the first embodiment. The third embodiment is different from the second embodiment only in terms of displacement restricting portions 236A and 236B configured to restrict the internal tooth pins 20 from being displaced from the pin grooves 18. Except for this, the third embodiment is the same as the second embodiment.

In the speed reducer 210 relating to the third embodiment, bearings 212 interposed between the casing 11 and the first and second carrier blocks 13A and 13B each include an outer race 212o and an inner race 212i. The inner races 212i are fixedly attached to the outer peripheries of the first and second carrier blocks 13A and 13B. The outer races 212o are in contact with the inner circumferential surface of the axial ends of the casing 11 and with the axially external end surfaces of the pin grooves 18. The inner races 212i of the bearings 212 respectively have cylindrical (annular) displacement restricting portions 236A and 236B integrated therewith, which extend linearly, at a position axially inside the outer races 212o (at the position facing the first and second oscillating gears 15A and 15B).

The internal tooth pins 20, which are housed in the pin grooves 18 of the casing 11, are long in the axial direction such that they axially outwardly protrude beyond the first and second oscillating gears 15A and 15B. In the third embodiment, the axial length of the internal tooth pins 20 is also less than the axial width of the pin grooves 18 formed in the casing 11. The cylindrical displacement restricting portions 236A and 236B of the bearings 212 are provided at a position inside the internal tooth pins 20 in the radial direction of the casing 11 and overlap the ends of the internal tooth pins 20 in the axial direction.

In the present embodiment, the protruding length of the displacement restricting portions 236A and 236B in the overlapping direction beyond the end surfaces of the pin grooves of the casing 11 is less than the length from the axially external end surfaces of the first and second oscillating gears 15A and 15B to the end surfaces of the outer races 212o of the bearings 212 (to the end surfaces of the pin grooves 18). With such configuration, the present embodiment produces the same effects. The oscillatory rotation of the first and second oscillating gears 15A and 15B is not restricted by interference between (i) the displacement restricting portions 236A and 236B and (ii) the end surfaces of the first and second oscillating gears 15A and 15B in the axial direction.

As described above, in the speed reducer 210 relating to the third embodiment, the internal tooth pins 20 are long in the axial direction such that they axially outwardly protrude beyond the first and second oscillating gears 15A and 15B. The inner races 212i of the bearings 212 have the cylindrical displacement restricting portions 236A and 236B integrated therewith. The displacement restricting portions 236A and 236B are positioned inside the internal tooth pins 20 in the radial direction of the casing 11, and axially overlap the ends of the internal tooth pins 20. Accordingly, if some of the external teeth 15Aa and 15Ba of the first and second oscillating gears 15A and 15B engage with the internal tooth pins 20 less deeply during the operation of the speed reducer 210, the internal tooth pins 20 come into contact with the outer circumferential surface of the displacement restricting portions 236A and 236B. In this manner, the internal tooth pins 20 can be prevented from moving out of the pin grooves 18. If the speed reducer 210 relating to the present embodiment is employed, the internal tooth pins 20 can be saved from behaving unreliably during the operation of the speed reducer 210. The speed reducer 210 can thus operate more stably.

In the speed reducer 210 relating to the third embodiment, the cylindrical displacement restricting portions 236A and 236B, which protrude axially inwardly, are integrally provided on the inner races 212i of the bearings 212. Unlike the case where dedicated components are additionally provided to prevent the internal tooth pins 20 from moving out of the pin grooves 18, the speed reducer 210 relating to the present embodiment can achieve a reduced number of components and a reduced axial length.

Fourth Embodiment

Figure 8:
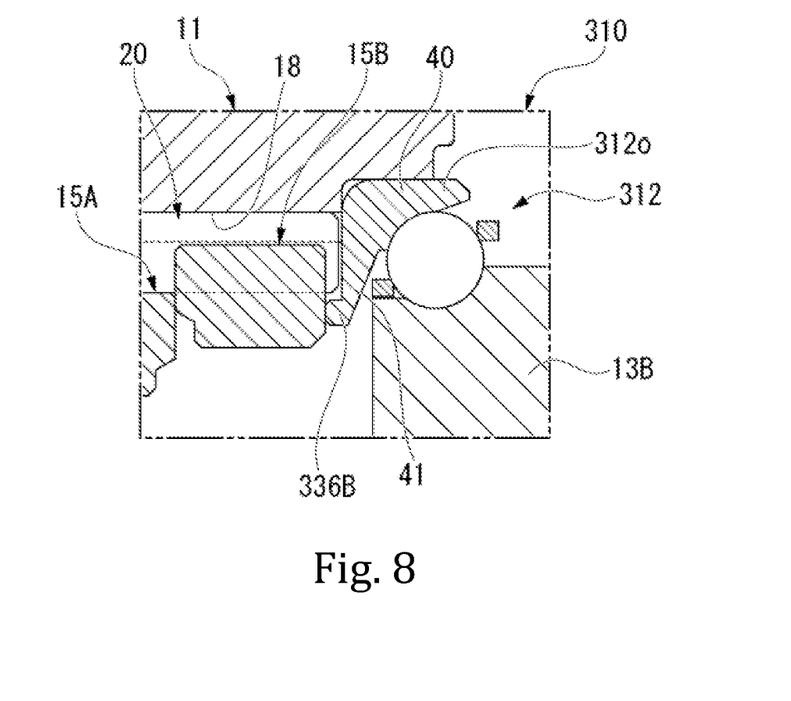
FIG. 8 is a sectional view of part of a speed reducer according to a fourth embodiment.

FIG. 8 is a sectional view showing part of a speed reducer 310 according to a fourth embodiment. FIG. 8 shows part of a sectional view corresponding to the sectional view of FIG. 2 showing the first embodiment. The fourth embodiment is different from the second embodiment only in terms of a displacement restricting portion 336B configured to restrict the internal tooth pins 20 from being displaced from the pin grooves 18. Except for this, the fourth embodiment is the same as the second embodiment.

In the speed reducer 310 relating to the fourth embodiment, the displacement restricting portion 336B is integrally formed on an outer race 312o of a bearing 312, which is interposed between the casing 11 and the first and second carrier blocks (FIG. 8 only shows the second carrier block 13B). In the present embodiment, the inner race of bearing 312 is formed by a portion of the carrier block (13B). The outer race 312o is in contact with the inner circumferential surface of the axial end of the casing 11 and with the axially external end surfaces of the pin grooves 18.

The internal tooth pins 20, which are housed in the pin grooves 18 of the casing 11, are long in the axial direction such that they axially outwardly protrude beyond the first and second oscillating gears 15A and 15B. The axial length of the internal tooth pins 20 is less than the axial width of the pin grooves 18 formed in the casing 11.

The outer race 312o of the bearing 312 has an outer race body 40, an inward flange 41, and the displacement restricting portion 336B. The outer race body 40 is in contact with the inner circumferential surface of the axial end of the casing 11 and with the axially external end surfaces of the pin grooves 18. The inward flange 41 extends radially inwardly from the axially internal end of the outer race body 40. The displacement restricting portion 336B protrudes from the radially internal end of the inward flange 41, inwardly in the axial direction. The displacement restricting portion 336B is cylindrical and has a short axial length. The displacement restricting portion 336B of the outer race 312o is positioned inside the internal tooth pins 20 in the radial direction of the casing 11 and overlaps the ends of the internal tooth pins 20 in the axial direction.

The protruding length of the displacement restricting portion 336B in the overlapping direction beyond the end surfaces of the pin grooves of the casing 11 is less than the length from the axially external end surfaces of the first and second oscillating gears 15A and 15B to the end surface of the outer race body 40 (to the end surfaces of the pin grooves 18). With such configuration, the present embodiment also produces the same effects. The oscillatory rotation of the first and second oscillating gears 15A and 15B is not restricted by interference between (i) the displacement restricting portion 336B and (ii) the axial end surfaces of the first and second oscillating gears 15A and 15B.

As described above, in the speed reducer 310 relating to the fourth embodiment, the internal tooth pins 20 are long in the axial direction such that they axially outwardly protrude beyond the first and second oscillating gears 15A and 15B. The outer race 312o of the bearing 312 has the cylindrical displacement restricting portion 336B integrated therewith. The displacement restricting portion 336B is positioned inside the internal tooth pins 20 in the radial direction of the casing 11 and axially overlaps the ends of the internal tooth pins 20. Accordingly, if some of the external teeth 15Aa and 15Ba of the first and second oscillating gears 15A and 15B engage with the internal tooth pins 20 less deeply during the operation of the speed reducer 310, the internal tooth pins 20 come into contact with the outer circumferential surface of the displacement restricting portion 336B. In this manner, the internal tooth pins 20 can be prevented from moving out of the pin grooves 18. If the speed reducer 310 relating to the present embodiment is employed, the internal tooth pins 20 can be saved from behaving unreliably during the operation of the speed reducer 310. The speed reducer 310 can thus operate more stably.

In the speed reducer 310 relating to the fourth embodiment, the displacement restricting portion 336B is integrally provided on the outer race 312o of the bearing 312. Unlike the case where dedicated components are additionally provided to prevent the internal tooth pins 20 from moving out of the pin grooves 18, the speed reducer 310 relating to the present embodiment can achieve a reduced number of components and a reduced axial length.

The present invention is not limited to the above-described embodiments, and the embodiments can be modified in a variety of designs without deviating from the spirit of the present invention. For example, in the embodiments, the two oscillating gears are disposed within the outer tubular member (casing, but the number of oscillating gears disposed within the outer tubular member is not limited to two. For example, in the first embodiment, the number of oscillating gears can be determined any manner as long as the number is two or more. Furthermore, in the second to fourth embodiments, the number of oscillating gears can be one, or three or more.

What is claimed is:
1. A speed reducer comprising:
an outer tubular member having a plurality of pin grooves on an inner circumferential surface thereof;

a plurality of internal tooth pins rotatably disposed in the pin grooves of the outer tubular member;

a plurality of oscillating gears having external teeth smaller in number than the internal tooth pins, the oscillating gears being oscillatorily rotatable with the external teeth engaging with the internal tooth pins; and a carrier block rotatably supported by the outer tubular member, wherein the carrier block is cooperatively connected to the oscillating gears such that the oscillating gears are allowed to oscillatorily rotate relative to the carrier block and the oscillating gears are restricted from rotating on own axis relative to the carrier block, wherein an annular displacement restricting member is disposed between outer peripheries of the oscillating gears adjacent to each other, and wherein the displacement restricting member restricts the internal tooth pins from being displaced inwardly in a radial direction of the outer tubular member.

2. The speed reducer of claim 1, wherein a width of the displacement restricting member in an axial direction of the outer tubular member is less than an interval between the outer peripheries of the oscillating gears adjacent to each other.

3. The speed reducer of claim 2, wherein, on inner peripheries of the oscillating gears adjacent to each other, bosses are provided that abut each other in the axial direction of the outer tubular member.

4. A speed reducer comprising:

an outer tubular member having a plurality of pin grooves on an inner circumferential surface thereof;

a plurality of internal tooth pins rotatably disposed in the pin grooves of the outer tubular member;

an oscillating gear having external teeth smaller in number than the internal tooth pins, the oscillating gear being oscillatorily rotatable with the external teeth engaging with the internal tooth pins; and a carrier block rotatably supported by the outer tubular member, wherein the carrier block is cooperatively connected to the oscillating gear such that the oscillating gear is allowed to oscillatorily rotate relative to the carrier block and the oscillating gear is restricted from rotating on own axis relative to the carrier block, wherein the carrier block further includes an adjacently arranged portion that is adjacent to and axially outside the oscillating gear, wherein the internal tooth pins are axially long such that the internal tooth pins protrude axially outwardly beyond the oscillating gear, and wherein the adjacently arranged portion is provided with an annular displacement restricting portion, and the displacement restricting portion is positioned inside the internal tooth pins in a radial direction of the outer tubular member and axially overlaps ends of the internal tooth pins.

5. A speed reducer comprising:

an outer tubular member having a plurality of pin grooves on an inner circumferential surface thereof;

a plurality of internal tooth pins rotatably disposed in the pin grooves of the outer tubular member;

an oscillating gear having external teeth smaller in number than the internal tooth pins, the oscillating gear being oscillatorily rotatable with the external teeth engaging with the internal tooth pins;

a carrier block rotatably supported by the outer tubular member; and a bearing disposed between the outer tubular member and the carrier block, wherein the carrier block is cooperatively connected to the oscillating gear such that the oscillating gear is allowed to oscillatorily rotate relative to the carrier block and the oscillating gear is restricted from rotating on own axis relative to the carrier block, wherein the internal tooth pins are axially long such that the internal tooth pins protrude axially outwardly beyond the oscillating gear, and wherein an inner race of the bearing is provided with an annular displacement restricting portion, and the displacement restricting portion is positioned inside the internal tooth pins in a radial direction of the outer tubular member and axially overlaps ends of the internal tooth pins.

* * * * *